United States Patent
Suryawanshi et al.

(10) Patent No.: US 11,249,915 B2
(45) Date of Patent: Feb. 15, 2022

(54) CONTENT BASED CACHE FAILOVER

(71) Applicant: VMWARE, INC., Palo Alto, CA (US)

(72) Inventors: Vikas Suryawanshi, Bangalore (IN);
Kashish Bhatia, Bangalore (IN);
Zubraj Singha, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 130 days.

(21) Appl. No.: 16/810,881

(22) Filed: Mar. 6, 2020

(65) Prior Publication Data
US 2021/0216465 A1  Jul. 15, 2021

(30) Foreign Application Priority Data

Jan. 9, 2020  (IN) .............................. 202041000952

(51) Int. Cl.
*G06F 12/00* (2006.01)
*G06F 12/0891* (2016.01)
*G06F 12/02* (2006.01)
*G06F 11/20* (2006.01)
*G06F 12/0875* (2016.01)

(52) U.S. Cl.
CPC ...... *G06F 12/0891* (2013.01); *G06F 11/2023* (2013.01); *G06F 12/0246* (2013.01); *G06F 12/0875* (2013.01); *G06F 2212/152* (2013.01)

(58) Field of Classification Search
CPC ............. G06F 12/0891; G06F 12/0246; G06F 11/2023; G06F 12/0875; G06F 2212/152

USPC ......................................................... 711/154
See application file for complete search history.

(56) References Cited

U.S. PATENT DOCUMENTS

| | | | |
|---|---|---|---|
| 6,378,037 B1 * | 4/2002 | Hall | |
| 2013/0318301 A1 * | 11/2013 | Chen | |
| 2017/0262347 A1 * | 9/2017 | Wallace | |
| 2018/0314542 A1 * | 11/2018 | Karkun | |

FOREIGN PATENT DOCUMENTS

CH           102508790 B  * 11/2011

* cited by examiner

*Primary Examiner* — Mardochee Chery
(74) *Attorney, Agent, or Firm* — Patterson + Sheridan, LLP

(57) ABSTRACT

Methods and systems are disclosed for populating a fail-over cache. When host computer systems in a system each have a content based read cache, the methods and system provide several functions applied in different orders for determining blocks that are to be included in the fail-over cache. Each function attempts a different strategy for combining the contents of the caches of each host computer system into the fail-over cache. If any strategy is successful, then the fail-over cache is placed into service. If all of the strategies fail, then an eviction strategy is employed in which blocks are evicted from each cache until the combination of caches meets a requirement of the fail-over cache, which, in one embodiment, is the size of the fail-over cache.

20 Claims, 11 Drawing Sheets

CONTENT BASED CACHE FAILOVER

RELATED APPLICATIONS

Benefit is claimed under 35 U.S.C. 119(a)-(d) to Foreign Application Serial No. 202041000952 filed in India entitled "CONTENT BASED CACHE FAILOVER", on Jan. 9, 2020, by VMware, Inc., which is herein incorporated in its entirety by reference for all purposes.

BACKGROUND

Content Based Read Caches (CBRC) can be used by virtual computing instances (VCIs) such as virtual machines (VMs) to get better performance by caching frequently-accessed data in a reserved memory region of a host computer system. If a VM enables the CBRC in its configuration, a VM manager reserves a space in the host computer system's memory for the CBRC to cache read data for that VM running on the host computer system. Every host computer system has its own CBRC cache available for all VMs residing on that host computer system.

Each CBRC-enabled VM has better performance if applications running inside VMs are the same because similar I/O requests are cached in CBRC cache, and all of the VMs can make use of the cached data. In addition, with all of the VMs running the same application, it may take several days before the CBRC cache becomes completely filled with unique data.

However, if a host computer system fails, there is no way to reuse the cache that took such a long time to fill. It is desirable that the contents of the cache be reusable so that a workload can resume with similar performance to that before the failure.

SUMMARY

One embodiment provides a method of populating a fail-over cache. The method includes determining that a first host computer has failed, the first host computer running at least one virtual computing instance and including a first content based read cache (CBRC) in memory of the first host computer, the first CBRC being configured to cache first blocks of read data for the at least one virtual computing instance, restarting the at least one virtual computing instance on a second host computer configured as a fail-over host for the first host computer. The method further includes determining whether the second host computer includes a second CBRC in memory of the second host computer. When it is determined the second host computer does not include the second CBRC, the method copies the first blocks in the first CBRC to the second host computer to generate a fail-over cache for the second host computer, the fail-over cache having a size limit. When it is determined the second host computer does include the second CBRC, the method merges the first blocks in the first CBRC with second blocks of read data for at least one additional virtual computing instance in the second CBRC to form the fail-over cache for the second host computer.

Further embodiments include a computer system configured to carry out one or more aspects of the above method, and a non-transitory computer-readable storage medium containing computer-readable code executable by one or more computer processors to carry out one or more aspects of the above method.

DETAILED DESCRIPTION

A system and method are described herein for populating a fail-over cache. When the fail-over host computer system does not employ a content based read cache, then a copy of the content based read cache for the failed host computer system is used. When the fail-over host computer system and the failed host computer system both employ such caches, then a merge function is employed. The merge function selects among several ways for populating a fail-over cache. One way to populate the failover cache is to add blocks to the failover cache based on assigned priorities of the virtual machines whose blocks reside in the failed host computer system cache and the failover host computer system cache. Another way is to combine the failed host computer system's cache and the failover host computer system's cache and then deduplicate blocks in the combined set of blocks. Yet another way is to determine the most frequently accessed blocks in the failed host computer system's cache and the failover host computer system's cache and populate the failover cache with only the most frequently accessed blocks. Finally, if any of these ways of populating the failover cache does not succeed, blocks are evicted from the failed host computer system's cache and the failover host computer system's cache until the size of the resulting set of blocks fits in the failover cache.

Figure 1:
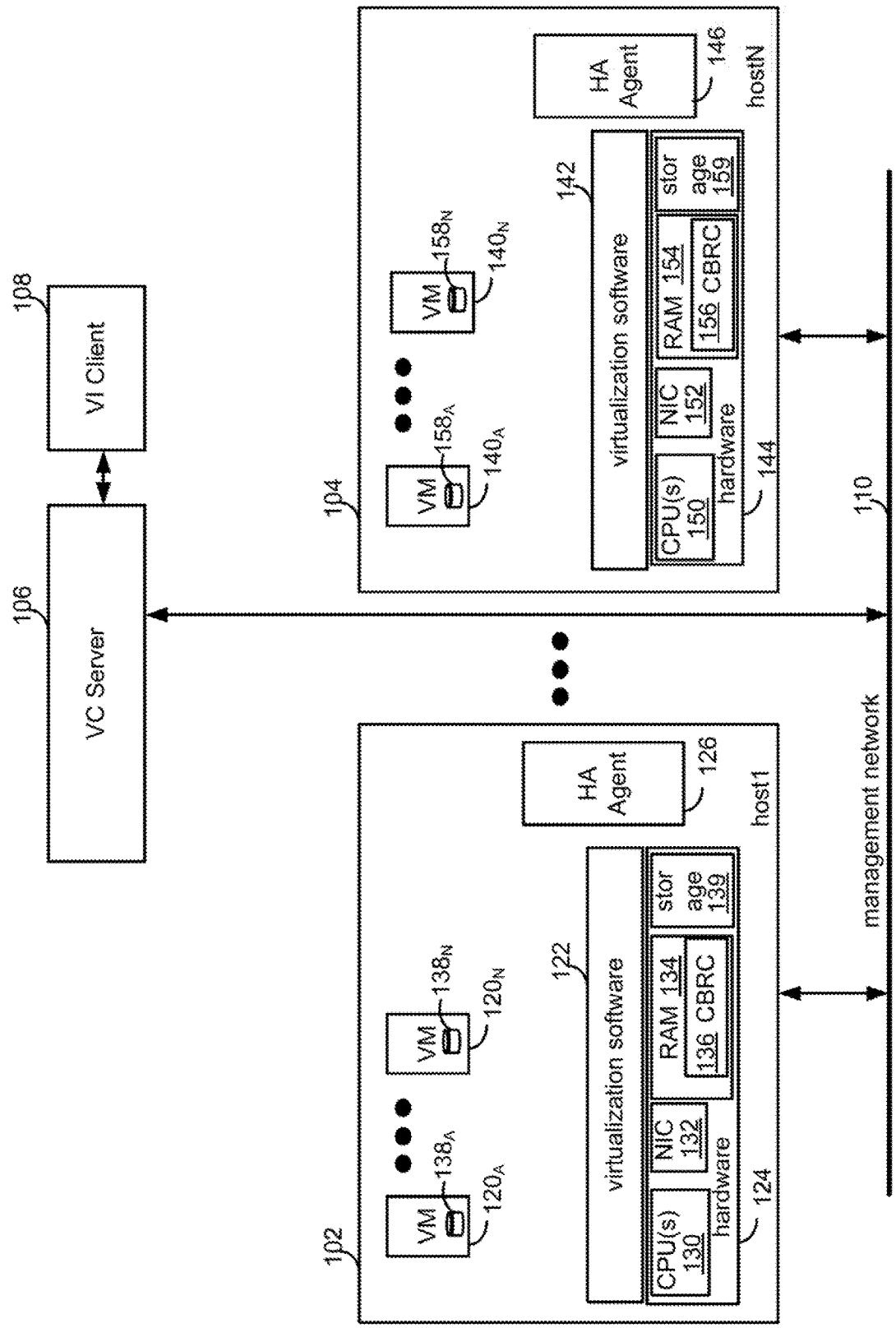
FIG. 1 depicts a block diagram of a computer system that is representative of a computer architecture in which embodiments may be implemented.

FIG. 1 depicts a block diagram of a computer system that is representative of a computer architecture in which embodiments may be implemented. The figure depicts a cluster of host computer systems 102 (e.g., first host computer), 104 (e.g., second host computer), which are connected to a management network 110. Also depicted is a Virtual Center (VC) server 106 connected to management network 110 and to a Virtual Infrastructure (VI) client 108.

Host computer system 102 in the cluster includes hardware 124, virtualization software 122, a high availability (HA) agent 126, and one or more virtual machines (VMs) $120_{A-N}$. Each virtual machine (VM) $120_{A-N}$ has at least one virtual disk (VMDK) $138_{A-N}$, which is backed by a file in persistent physical storage 139.

Hardware 124 in host computer system 102 includes one or more CPUs 130, a network interface controller (NIC) 132 and RAM 134. NIC 132 allows VMs $120_{A-N}$ to communicate with management network 110. RAM 134 contains a CBRC 136 (e.g., first CBRC) in a reserved memory space of RAM 134. CBRC 136 is a cache for VMs $120_{A-N}$ and stores frequently accessed blocks (e.g., first blocks of read data) for VMs $120_{A-N}$ on host computer systems 102.

Host computer system 104 in the cluster includes hardware 144, virtualization software 142, a high availability (HA) agent 146, and one or more virtual machines $140_{A-N}$. Each virtual machine (VM) $140_{A-N}$ has at least one virtual disk (VMDK) $158_{A-N}$ which is backed by a file in persistent physical storage 159.

Hardware 124 in host computer system 104 includes one or more CPUs 150, a network interface controller (NIC) 152, and RAM 154. NIC 152 allows VMs $140_{A-N}$ to communicate with management network 110. RAM 154 contains a CBRC 156 (e.g., second CBRC) in a reserved memory space of RAM 154. CBRC 156 is a cache for VMs $140_{A-N}$ and stores frequently accessed blocks (e.g., second blocks of read data) for VMs $140_{A-N}$ on host computer system 104.

VC server 106 manages the cluster of host computer systems 102, 104. VC server 106 places HA agent 126, 146 in each host computer system 102, 104 of the cluster so that each host computer system 102, 104 can communicate with other host computer systems to maintain state information and knows how to proceed in the case of another host computer system's failure. In particular, one HA agent among the HA agents in the cluster is designated the master HA. The master HA, say HA agent 126, monitors signals from other host computer systems in the cluster and communicates with VC server 106. Each host computer system 102, 104 within the cluster communicates via a heartbeat, which is a periodic message that indicates a host computer system is running as expected. If the master HA fails to detect a heartbeat signal from another host computer system within the cluster, the master HA instructs VC server 106 to take corrective action. For example, if an entire host computer system fails, VC server 106 restarts all affected VMs on other host computer systems in the cluster.

The VI client 108 connects to VC server 106 to provide client access to VC server 106.

Figure 2A:
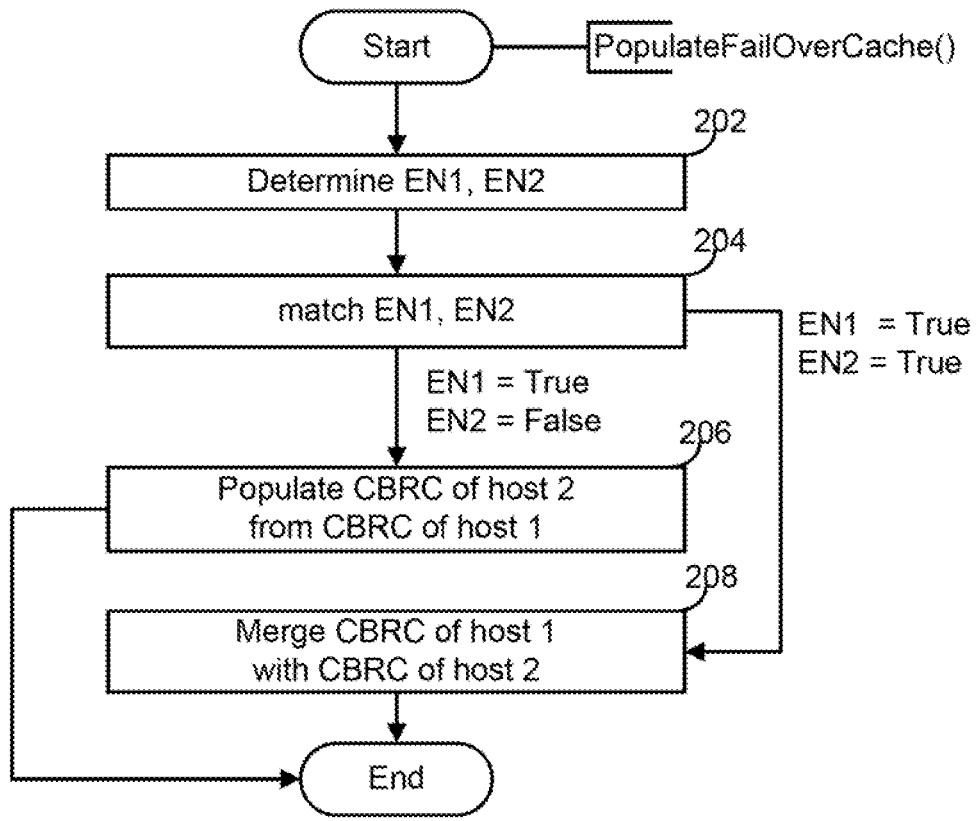
FIG. 2A depicts a flow of operations for constructing a fail-over cache, in an embodiment.

FIG. 2A depicts a flow of operations for populating a fail-over cache, in an embodiment.

To enable CBRC for any workload, there is a digest file per virtual disk (VMDK) $138_{A-N}$, $158_{A-N}$, which stores a hash value of each block of the virtual disk and a key such as the file name of the file containing the block. Using hash values and a bitmap of valid cached blocks, these digest files help CBRC identify which blocks are cached in reserved memory space of RAM 134, 154 of each host computer system 102, 104. Also, for any host computer system that has a CBRC enabled, the host computer system stores an image of the CBRC in the permanent storage of the host computer system. A further description of the digest file is provided in U.S. application Ser. No. 15/655,938, which is incorporated by reference in its entirety.

In step 202, the populate function determines whether the content based read cache CBRC 136, 156 is enabled, which means that virtualization software 122, 142 has reserved an area in RAM 134, 154 that virtualization software 122, 142 allows for use as a cache for virtual machines $120_{A-N}$, $140_{A-N}$ running on virtualization software 122, 142. If CBRC 156 is not enabled (i.e., EN2=False) and CBRC 136 is enabled (i.e., EN1=True) as determined by step 204, the populate function populates in step 206 CBRC 156 with the data from CBRC 136 using a backup image of CBRC 136 stored in a shared disk in persistent storage 139 of host computer system 1 102 to which host computer system 2 104 also has access. In this case, the fail-over cache (CBRC 156) is equivalent to CBRC 136 in host computer system 1 102. In an embodiment, HA agent 126 performs the populate function, step 206, before VMs $120_{A-N}$ are powered-on on host 2 104.

If CBRC 156 is enabled (i.e., EN2=True) for host computer system 2 104 and CBRC 136 is enabled (i.e., EN1=True), then the populate function performs a merge function in step 208 to populate the fail-over cache (CBRC 156). In this case, the fail-over cache is the result of performing the merge function. Thus, the fail-over cache is the cache that results from the operations of FIG. 2A. In an embodiment, HA agent 126 performs the merge function, step 208, before VMs $120_{A-N}$ are powered-on on host 2 104.

Figure 2B:
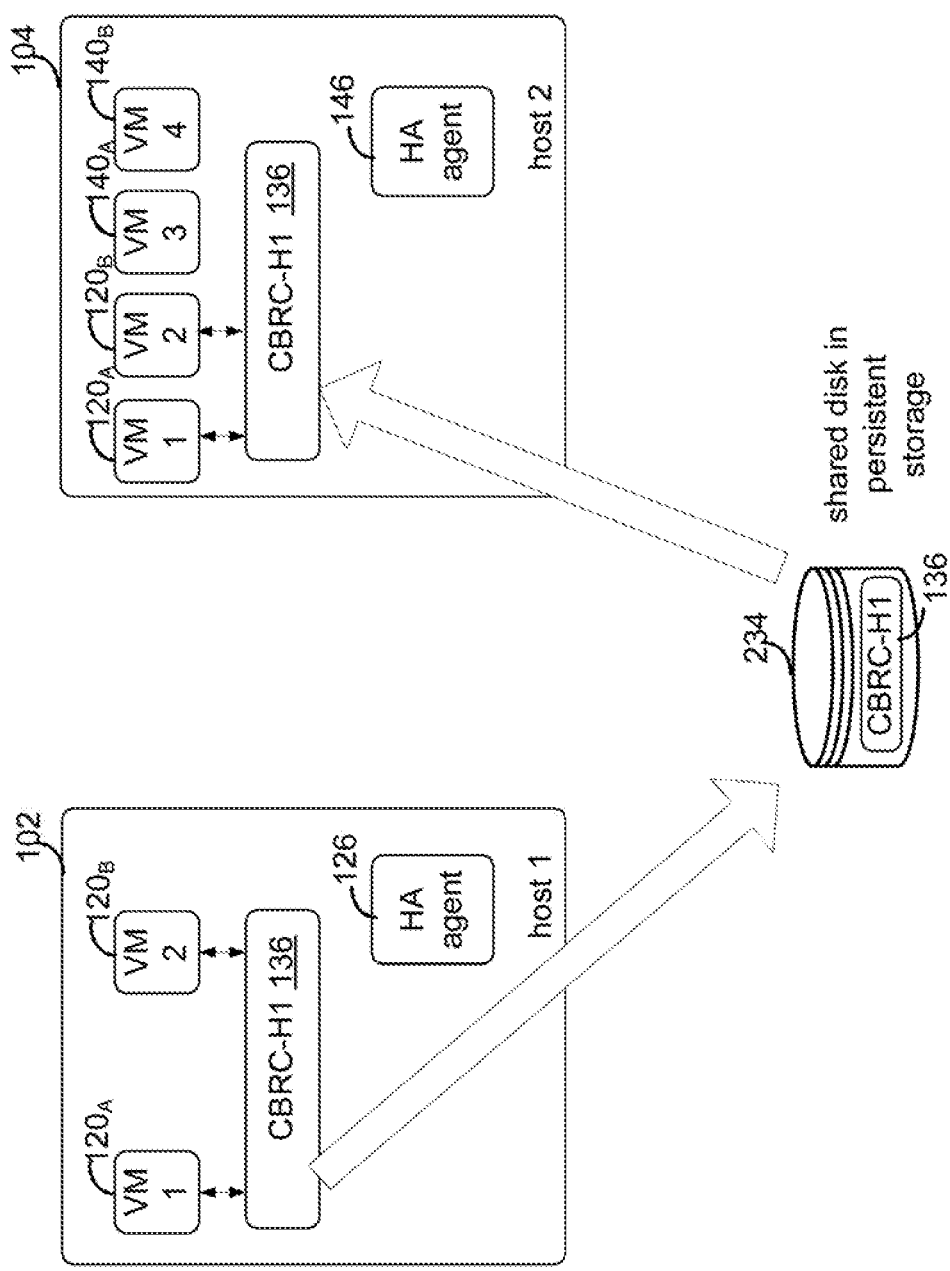
FIG. 2B depicts a first case of a failed host computer system.

FIG. 2B depicts a first case of a failed host computer system, which is the case in which CBRC 156 is not enabled (EN1=True, EN2=False). In the figure, host computer system 1 102 includes two virtual machines 120A, 120B using CBRC 136, and HA agent 126. CBRC 136 is backed up on shared disk 234. Host computer system 2 104 has virtual machines 140A, 140B, and HA agent 146. If and when a failure of host computer system 1 102 occurs, host computer system 2 104 serves as the fail-over host computer system. However, in this case, host computer system 2 104 does not have a CBRC supporting virtual machines 140A, 140B. Thus, a reserved area in host computer system 2 can be populated with the contents of CBRC 136 on shared disk 234. Virtual machines 120A, 120B are then transferred to host computer system 2 104, which then restarts virtual machines 120A, 120B, and allows virtual machines 120A, 120B to have access to CBRC 136. Thus, virtual machines 120A, 120B run efficiently because they do not lose the context of CBRC 136.

Figure 2C:
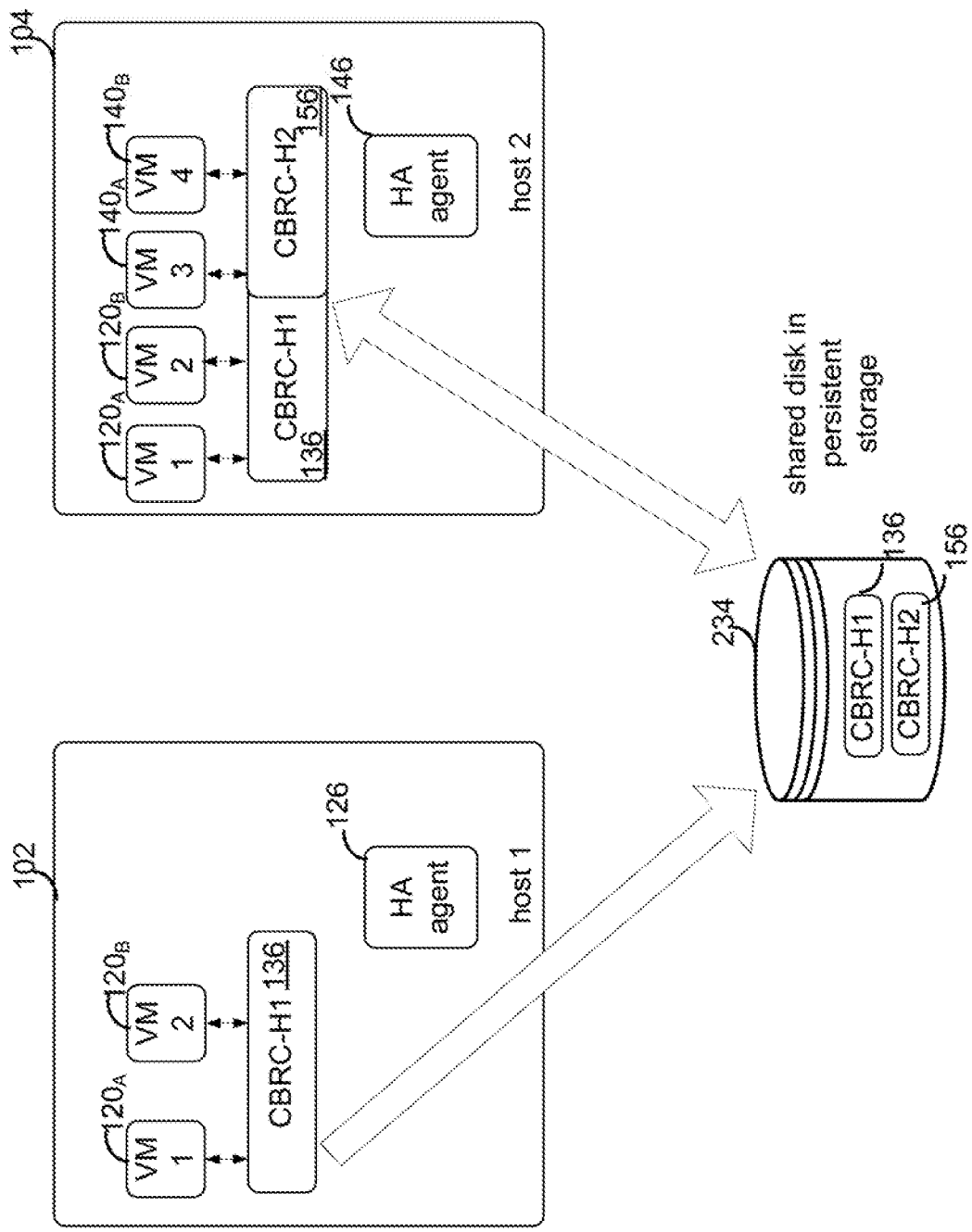
FIG. 2C depicts a second case of a failed host computer system.

FIG. 2C depicts a second case of a failed host computer system, which is the case in which CBRC 136 and CBRC 156 are both enabled (EN1=True, EN2=True). In the figure, host computer system 1 runs virtual machines 120A, 120B, and gives them access to CBRC 136. However, host computer system 2 104 runs virtual machines 140A, 140B, and gives them access to a CBRC 156 on host computer system 2 104. Both CRBC 136 and CBRC 156 are backed up on shared disk 234. If and when a failure of host computer system 1 102 occurs, host computer system 2 104 serves as the fail-over host computer system. Virtual machines 120A, 120B are transferred to host computer system 2 104, but because both host computer system 1 102 and host computer system 2 104 have CBRCs supporting the virtual machines, CBRC 136 on host computer system 1 102 must be merged with CBRC 156 on host computer system 2 104. The merge function is further described in reference to FIG. 3.

Figure 3:
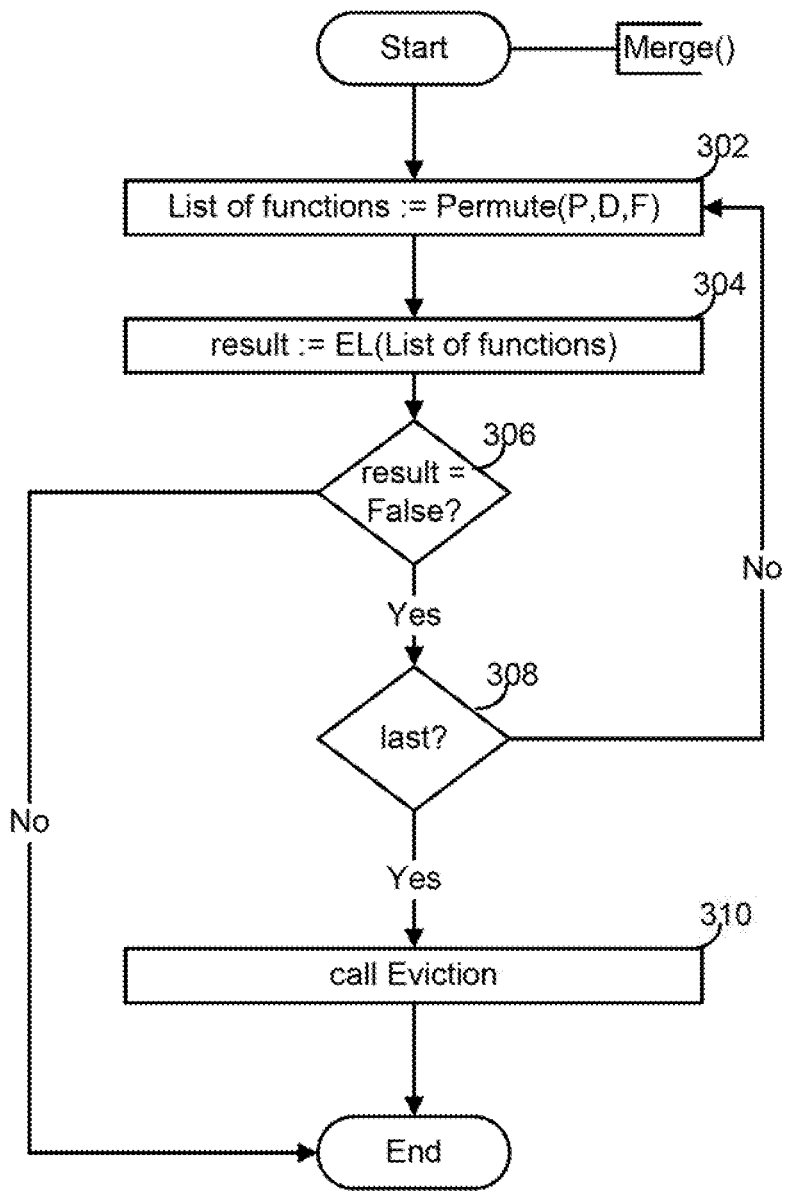
FIG. 3 depicts a flow of operations for the merge function, in an embodiment.

FIG. 3 depicts a flow of operations for the merge function, in an embodiment. In step 302, the merge function, which is the top-level function, obtains a list of three different designators, designated 'P' 'D', and 'F' respectively for priority, deduplication, and frequency from a permute function, where each designator refers to a way of merging CBRC 136 with CBRC 156. The priority function is further described in reference to FIG. 6. The deduplication function is further described in reference to FIG. 7, and the frequency function is further described in reference to FIG. 8. The permute function determines the order of the three designators. Thus, each call of Permute(P, D, F) provides a list of one of six (3!) possible permutations of the designators P, D, and F until all of the permutations have been tried. It should be noted that in some embodiments not all permutations are tried, and only some of the permutations may be tried. Further, it should be noted that, in some embodiments, any number of combinations or permutations of one or more of or two or more of P, D, and F may be tried, in any order.

In step 304, the merge function calls an execute list (EL) function with the list of designators and the EL function returns a Boolean result. If the result is False, as determined in step 306, then the merge function determines in step 308, whether the permute function has exhausted all possible permutations of the designators. If so, then the merge function calls the evict function in step 310. If there are more permutations that have not been tried, then the merge function returns to step 302 to obtain the next untried permutation. Thus, only after all of the permutations of the designators have been tried and are unsuccessful, does the function perform the evict function, which is guaranteed to successfully merge CBRC 136 with CBRC 156. On the other hand, if any one of the permutations is successful, then the fail-over cache is made available for use.

Figure 4:
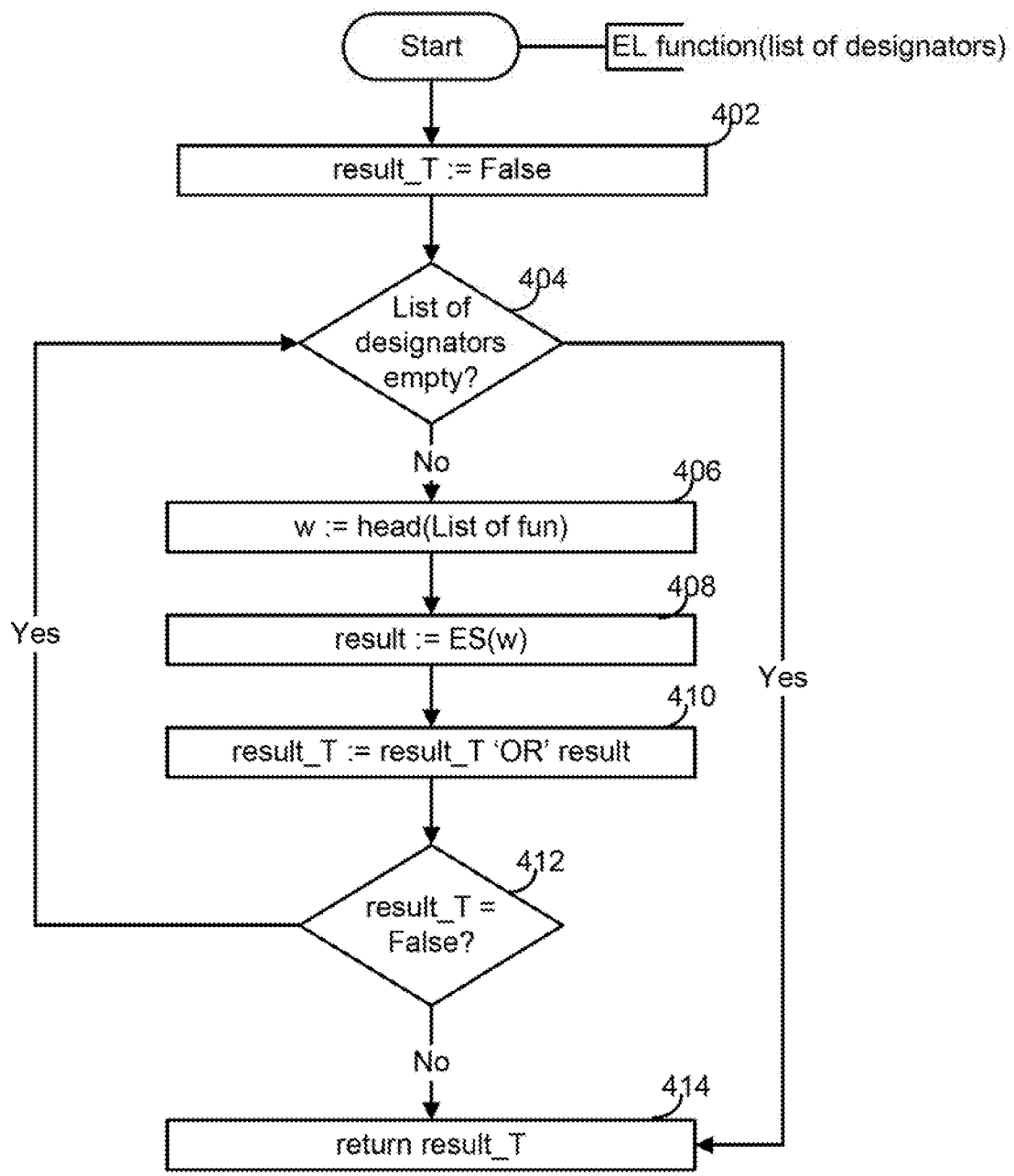
FIG. 4 depicts a flow of operations for the FL function, in an embodiment.

FIG. 4 depicts a flow of operations for the EL function, in an embodiment. The EL function causes the three functions priority, deduplication, and frequency to be called in the order designated by the current list of designators, which is a parameter of the EL function. In step 402, the EL function initializes a result variable, result_T, to False. This variable is used to keep track of the success or failure of any of the functions—priority, deduplication, and frequency—because a successful result from any one of them means that a fail-over cache has been successfully constructed from CBRC 136 and CBRC 156.

In step 404, the EL function determines whether the list of designators in the call is empty. If not, then in step 406, the EL function removes the name of the first designator (the head of the list) from the list and assigns it to the variable 'w' and calls, in step 408, an execute selected (ES) function which executes the function corresponding to the designator in the variable 'w'. For example, if the value of w is 'P', then the priority function is executed. If the value of w is 'D', then the deduplication function is executed, and if the value is 'F', then the frequency function is executed. The execute selected (ES) function returns a Boolean result in step 408, and that result is 'ORed' into the result_T variable in step 410. Thus, if the result is True, then result_T is True. If the result is false, then result_T stays False.

In step 412, the EL function tests the result_T variable. If, as determined in step 10, the result_T variable is False, then the EL function returns to step 404 to determine whether or not the list is empty, to step 406 to get the next item in the list if the list is not empty, to step 408 to call the ES function to execute the function corresponding to the designator in the variable w and to step 410 to 'OR' the result into result_T. If the result is True, as determined in step 412, then the EL function returns the result_T variable and the fail-over cache is successfully populated. Thus, the EL function tries each function in the list, using results from the previous attempt. If one succeeds, then the result_T variable is True; otherwise, the variable remains False.

Figure 5:
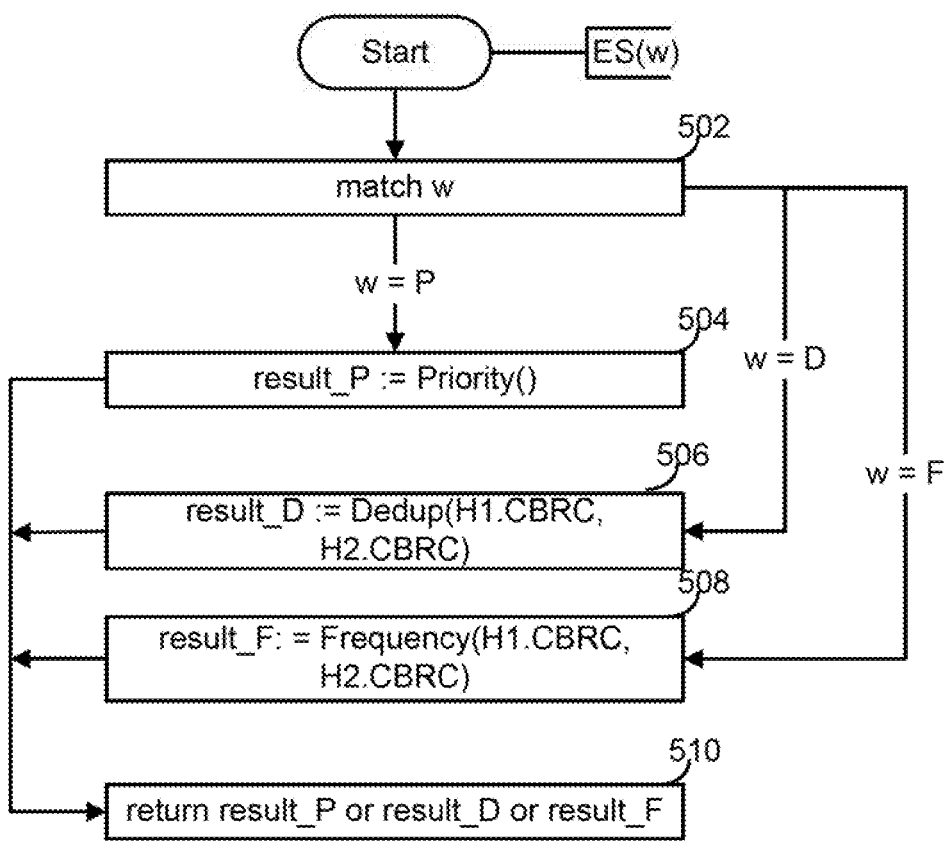
FIG. 5 depicts a flow of operations for the G function, in an embodiment.

FIG. 5 depicts a flow of operations for the execute selected function, in an embodiment. In step 502, the execute selected function dispatches an execution based on the contents of the variable 'w', which contains one of the designators 'P', 'D', or 'F'. If the variable matches 'P', then the execute selected function calls the priority function in step 504. If the variable matches 'D', then the execute selected function calls the deduplication function in step 506. If the variable matches 'F', then the execute selected function calls the frequency function in step 508. The execute selected function returns the result of the function that was called in step 510.

Figure 6:
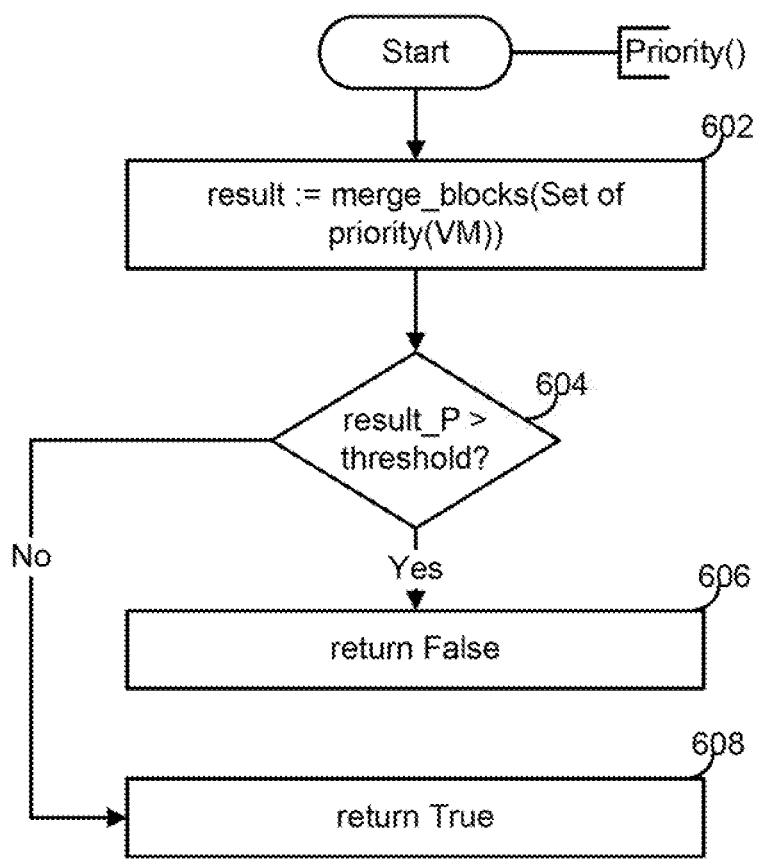
FIG. 6 depicts a flow of operations for the Priority function, in an embodiment.

FIG. 6 depicts a flow of operations for the priority function, in an embodiment. The priority function attempts to merge CBRC 136 with CBRC 156 so that the result, the fail-over cache, fits within the reserved space allowed. In step 602, the priority function calls the merge_blocks function to merge blocks from CBRC 136 and CBRC 156 based on the priorities of the virtual machines to which the blocks belong. The virtual machines to which the blocks belong are determined by the hash values and bit map described above, and priorities are assigned to the virtual machines. In one embodiment, priorities assigned to the virtual machines are based on their respective workloads. The merge_blocks function returns a result, result_P, which contains the resulting size of the fail-over cache. For example, merging comprises merging first blocks from the first CBRC 136 and second blocks from the second CBRC 156 into the fail-over cache based on assigned priorities of at least one VM 120 running on host computer 102 and at least one VM 140 running on host computer 104, wherein blocks of a higher priority VM are selected to be included in the fail-over cache prior to including blocks of a lower priority VM up to the threshold (e.g., the size limit). In step 604, the priority function tests result_P against a threshold corresponding to the allowed size of the fail-over cache to determine whether the function should return True or False. If the size is greater than the threshold, then in step 606, the priority function returns False, meaning that based on priorities, there are still too many blocks. If the size is less than the threshold, then in step 608, the priority function returns True, indicating that the MergeBlocks function succeeded.

Figure 7:
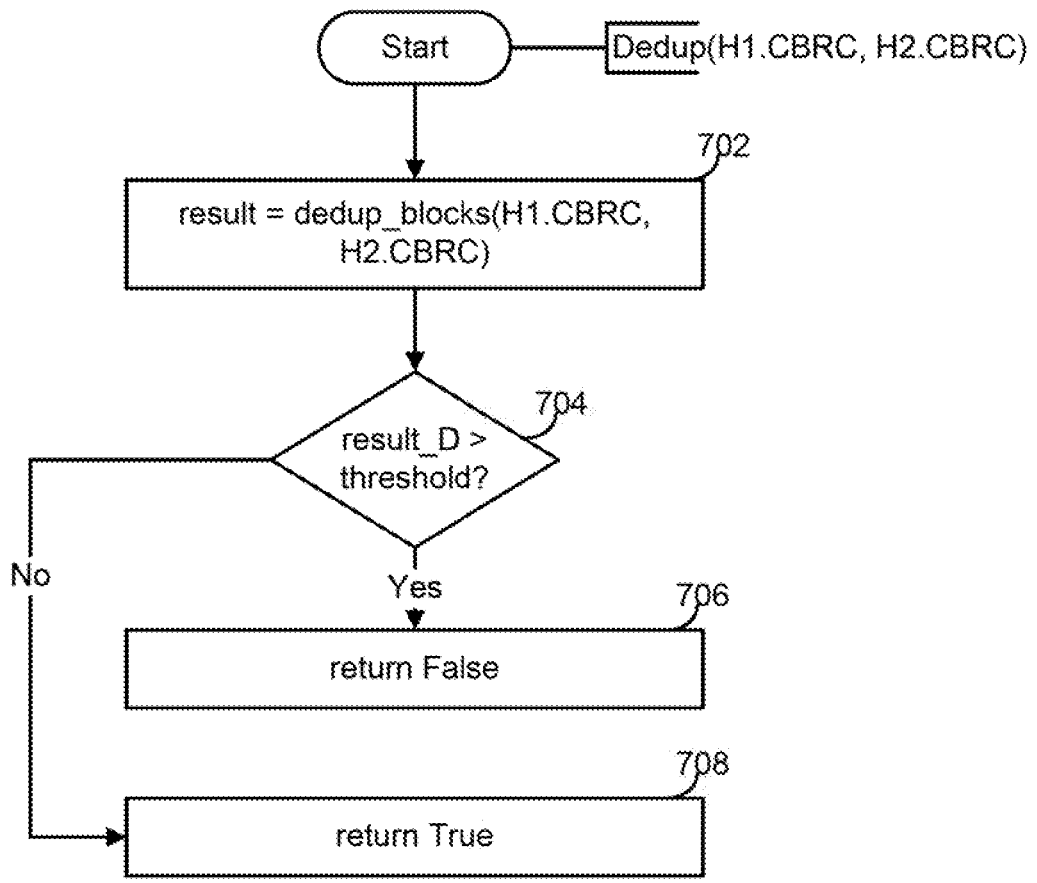
FIG. 7 depicts a flow of operations for the Duduk function, in an embodiment.

FIG. 7 depicts a flow of operations for the deduplication function, in an embodiment. In step 702, the deduplication function calls the dedup_blocks function. The dedup_blocks function examines CBRC 136 and CBRC 156 to determine any duplicate blocks among them. The dedup_blocks function then removes the duplicate blocks. The dedup_blocks function returns result_D, which contains the resulting size of the fail-over cache. For example, deduplication may be a type of merging that comprises deduplicating blocks by including a single block in the fail-over cache when each of the first CBRC 136 and the second CBRC 156 includes a block with the same content, wherein deduplication continues until the combination of the first CBRC 136 and the second CBRC 156, which forms the fail-over cache, does not exceed the threshold (e.g., the size limit). Result_D is tested in step 704 against the size threshold. If result_D exceeds the threshold, then the deduplication function returns a False in step 706, where False means that even after finding and deduplicating blocks among CBRC 136 and CBRC 156, there are still too many blocks. If result_D does not exceed the threshold, then the deduplication function returns True in step 708, and host computer system 2 104 can use the resulting fail-over cache.

Figure 8:
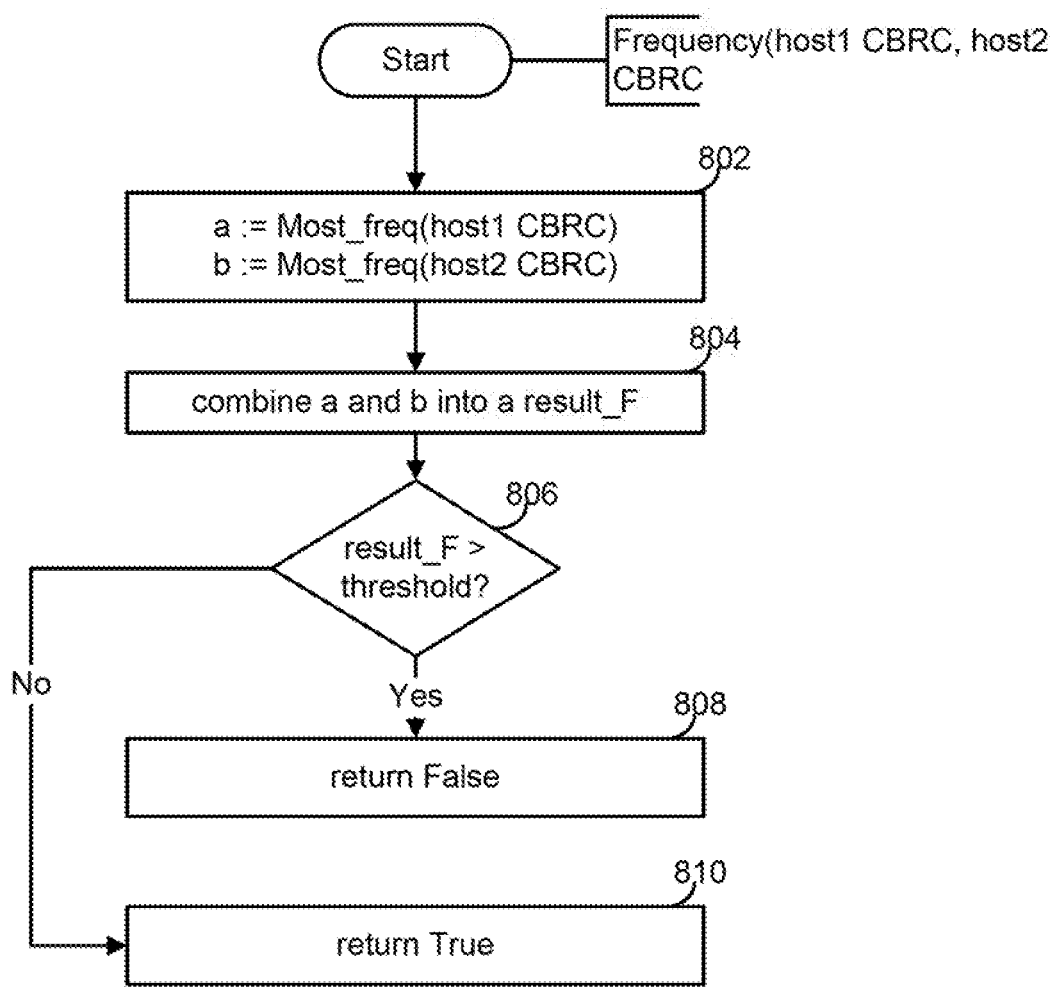
FIG. 8 depicts a flow of operations for the FreqBlocks function, in an embodiment.

FIG. 8 depicts a flow of operations for the frequency function, in an embodiment. In step 802, the frequency function determines the most frequently used blocks in CBRC 136, which is the set of blocks represented by variable 'a', by calling a most_freq function for CBRC 136. In one embodiment, the frequency information for blocks in CBRC 136 and CBRC 156 resides in the digest file. Also in step 802, the frequency function determines the most frequently used blocks in CBRC 156, which is the set of blocks represented by variable 'b' by calling most_freq for CBRC

156. In step 804, the frequency function combines set a and set b into result_F. For example, combining may be a type of merging that comprises merging first blocks from the first CBRC 136 and second blocks from the second CBRC 156 into the fail-over cache based on how frequently the first blocks and the second blocks are accessed, wherein blocks accessed more frequently are selected to be included in the fail-over cache prior to including blocks accessed less frequently up to the threshold (e.g., the size limit). In step 806, the frequency function tests result_F against the size threshold to determine whether or not the size of the combination (i.e., the sum) of set a and set b exceeds the size threshold. If result_F exceeds the size threshold, then the frequency function returns False in step 808, which means that after examining both CBRC 136 and CBRC 156, there are still too many blocks. If result_F does not exceed the size threshold, then the frequency function returns True in step 810, and host computer system 2 can use the resulting fail-over cache.

Figure 9:
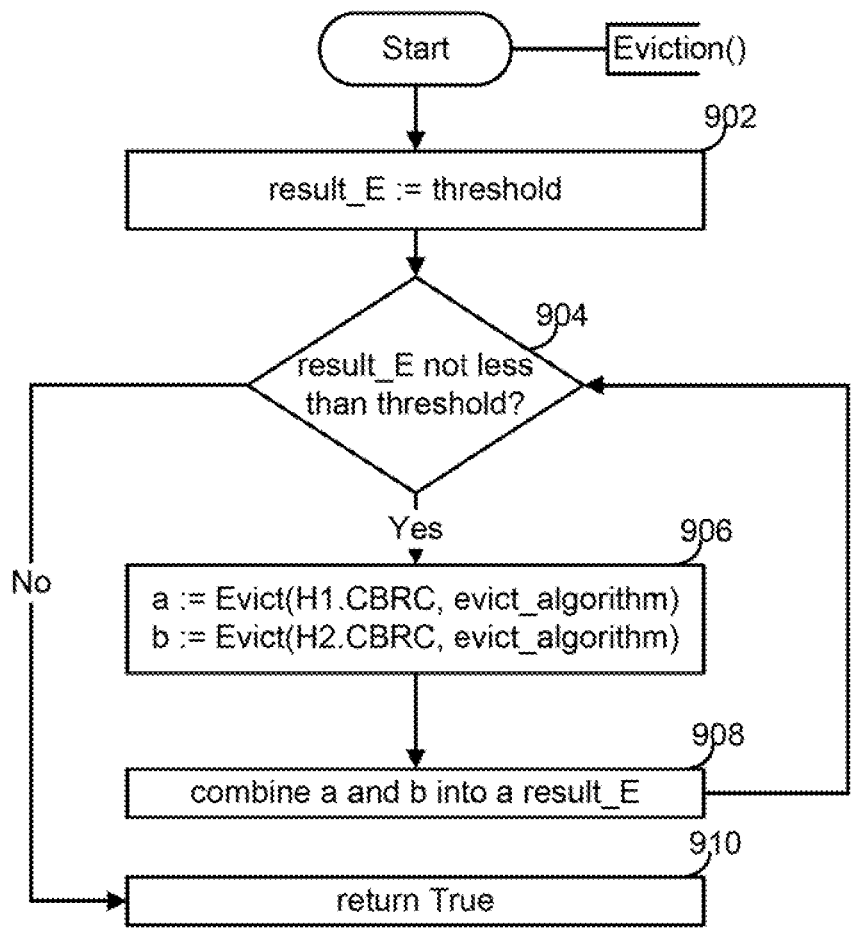
FIG. 9 depicts a flow of operations for the evict function, in an embodiment.

FIG. 9 depicts a flow of operations for the eviction function, in an embodiment. The eviction function is called when the tried combinations of the priority function, the deduplication function, and the frequency function fail to yield a fail-over cache that does not exceed the size threshold. In step 902, a result_E variable is initialized to the size threshold. In step 904, result_E is tested against the size threshold. If result_E is not less than the size threshold (which is true on the first pass), then in step 906, the eviction function calls an evict function for CBRC 136 with an eviction algorithm. The call returns a set of blocks labeled 'a' for those blocks remaining in CBRC 136 after the algorithm runs. Also in step 906, the eviction function calls the evict function for CBRC 156 with an eviction algorithm. The call returns a set of blocks 'b' for those blocks remaining in CBRC 156 after the eviction algorithm runs. In one embodiment, the eviction algorithms are the least recently used (LRU) algorithm. In one embodiment, the LRU algorithm moves a recently used block to the front of a list that tracks the blocks. In step 908, the outputs of each evict function, set a and set b, are combined into result_E and the evict function returns to step 904. For example, evicting may be a type of merging that comprises removing selected blocks from the first CBRC 136 and the second CBRC 156 until a number of blocks in the fail-over cache does not exceed the threshold (e.g., the size limit). If the result_E is not less than the threshold as determined in step 904, the eviction function executes step 906 again, evicting even more blocks using the algorithm. If the result is less than the threshold as determined in step 904, then in step 910, the evict function returns True. Thus, the eviction function performs evictions until the result meets the size threshold, after which host computer system 2 104 uses the fail-over cache.

Thus, the merge function attempts a sequence of one or more of functions, designated P, D, and F, until any one of them is successful. If any attempt of the priority function is successful, then the fail-over cache that results does not exceed the size threshold and can be used. If any attempt of the deduplication function is successful, then the fail-over cache can be used. If any attempt of the frequency function is successful, the fail-over cache can be used. Otherwise, the eviction function is called and blocks are removed from CBRC 136 and CBRC 156 until the sum of remaining blocks in CBRC 136, and CBRC 156 does not exceed the size threshold, and the fail-over cache can be used.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A method of recovering from a host failure, the method comprising:
   determining that a first host computer has failed, the first host computer running at least one virtual computing instance and including a first content based read cache (CBRC) in the first host computer's memory, the first CBRC being configured to cache first blocks of read data for the at least one virtual computing instance;
   restarting the at least one virtual computing instance on a second host computer configured as a fail-over host for the first host computer;
   determining whether the second host computer includes a second CBRC in the second host computer's memory;
   when it is determined the second host computer does not include the second CBRC, copying the first blocks in the first CBRC to the second host computer to generate a fail-over cache for the second host computer, the fail-over cache having a size limit; and
   when it is determined the second host computer does include the second CBRC, merging the first blocks in the first CBRC with second blocks of read data for at least one additional virtual computing instance in the second CBRC to form the fail-over cache for the second host computer.

2. The method of claim 1, wherein the merging comprises merging the first blocks from the first CBRC and the second blocks from the second CBRC into the fail-over cache based on assigned priorities of the at least one virtual computing instance and the at least one additional virtual computing instance, wherein blocks of a higher priority virtual computing instance are selected to be included in the fail-over cache prior to including blocks of a lower priority virtual computing instance up to the size limit.

3. The method of claim 1, wherein merging comprises deduplicating blocks by including a single block in the fail-over cache when each of the first CBRC and the second CBRC includes a block with the same content, wherein deduplication continues until a combination of the first CBRC and the second CBRC, which forms the fail-over cache, does not exceed the size limit.

4. The method of claim 1, wherein the merging comprises merging first blocks from the first CBRC and second blocks from the second CBRC into the fail-over cache based on how frequently the first blocks and the second blocks are accessed, wherein blocks accessed more frequently are selected to be included in the fail-over cache prior to including blocks accessed less frequently up to the size limit.

5. The method of claim 1, wherein the merging comprises removing selected blocks from the first CBRC and the second CBRC until a number of blocks in the fail-over cache does not exceed the size limit.

6. The method of claim 1, wherein the merging includes performing two or more of:
   (a) the merging of first blocks and second blocks based on assigned priorities of the at least one virtual computing instance;
   (b) deduplicating blocks by including a single block in the fail-over cache when each of the first CBRC and the second CBRC includes a block with the same content; and
   (c) merging first blocks from the first CBRC and second blocks from the second CBRC into the fail-over cache based on how frequently the first blocks and the second blocks are accessed.

7. The method of claim 6, wherein if performing steps (a), (b) and (c) fails to generate a fail-over cache within the size limit, then performing removing selected blocks from the first CBRC and the second CBRC until a number of blocks in the fail-over cache does not exceed the size limit.

8. A cluster of host computer systems comprising:
   a plurality of host computer systems including a first host computer system and a second host computer system, each of the host computer systems running at least one virtual computing instance, the first host computer system having a memory and including a first content based read cache (CBRC) therein, the first CBRC being configured to cache first blocks of read data for the at least one computing instance;
   a management network coupled to the plurality of host computer systems; and
   a virtual center server coupled to the management network;
   wherein the virtual center server is configured to:
      determine that the first host computer has failed;
      restart the at least one virtual computing instance on the second host computer configured as a fail-over host for the first host computer;
      determine whether the second host computer includes a second CBRC in the second host computer's memory;
      when it is determined the second host computer does not include the second CBRC, copy the first blocks in the first CBRC to the second host computer to generate a fail-over cache for the second host computer, the fail-over cache having a size limit; and
      when it is determined the second host computer does include the second CBRC, merge the first blocks in the first CBRC with second blocks of read data for at least one additional virtual computing instance in the second CBRC to form the fail-over cache for the second host computer.

9. The cluster of claim 8, wherein the merging comprises merging the first blocks from the first CBRC and the second blocks from the second CBRC into the fail-over cache based on assigned priorities of the at least one virtual computing instance and the at least one additional virtual computing instance, wherein blocks of a higher priority virtual computing instance are selected to be included in the fail-over cache prior to including blocks of a lower priority virtual computing instance up to the size limit.

10. The cluster of claim 8, wherein merging comprises deduplicating blocks by including a single block in the fail-over cache when each of the first CBRC and the second CBRC includes a block with the same content, wherein deduplication continues until a combination of the first CBRC and the second CBRC, which forms the fail-over cache, does not exceed the size limit.

11. The cluster of claim 8, wherein the merging comprises merging first blocks from the first CBRC and second blocks from the second CBRC into the fail-over cache based on how frequently the first blocks and the second blocks are accessed, wherein blocks accessed more frequently are selected to be included in the fail-over cache prior to including blocks accessed less frequently up to the size limit.

12. The cluster of claim 8, wherein the merging comprises removing selected blocks from the first CBRC and the second CBRC until a number of blocks in the fail-over cache does not exceed the size limit.

13. The cluster of claim 8, wherein the merging includes performing two or more of:

(a) the merging of first blocks and second blocks based on assigned priorities of the at least one virtual computing instance;

(b) deduplicating blocks by including a single block in the fail-over cache when each of the first CBRC and the second CBRC includes a block with the same content; and (c) merging first blocks from the first CBRC and second blocks from the second CBRC into the fail-over cache based on how frequently the first blocks and the second blocks are accessed.

14. The cluster of claim 13, wherein if performing steps (a), (b) and (c) fails to generate a fail-over cache within the size limit, then performing removing selected blocks from the first CBRC and the second CBRC until a number of blocks in the fail-over cache does not exceed the size limit.

15. A non-transitory computer-readable medium comprising instructions executable in a computer system, wherein the instructions when executed in the computer system cause the computer system to carry out a method recovering from a host failure, the method comprising:

determining that a first host computer has failed, the first host computer running at least one virtual computing instance and including a first content based read cache (CBRC) in the first host computer's memory, the first CBRC being configured to cache first blocks of read data for the at least one virtual computing instance;

restarting the at least one virtual computing instance on a second host computer configured as a fail-over host for the first host computer;

determining whether the second host computer includes a second CBRC in the second host computer's memory;

when it is determined the second host computer does not include the second CBRC, copying the first blocks in the first CBRC to the second host computer to generate a fail-over cache for the second host computer, the fail-over cache having a size limit; and when it is determined the second host computer does include the second CBRC, merging the first blocks in the first CBRC with second blocks of read data for at least one additional virtual computing instance in the second CBRC to form the fail-over cache for the second host computer.

16. The non-transitory computer-readable medium of claim 15, wherein the merging comprises merging the first blocks from the first CBRC and the second blocks from the second CBRC into the fail-over cache based on assigned priorities of the at least one virtual computing instance and the at least one additional virtual computing instance, wherein blocks of a higher priority virtual computing instance are selected to be included in the fail-over cache prior to including blocks of a lower priority virtual computing instance up to the size limit.

17. The non-transitory computer-readable medium of claim 15, wherein merging comprises deduplicating blocks by including a single block in the fail-over cache when each of the first CBRC and the second CBRC includes a block with the same content, wherein deduplication continues until a combination of the first CBRC and the second CBRC, which forms the fail-over cache, does not exceed the size limit.

18. The non-transitory computer-readable medium of claim 15, wherein the merging comprises merging first blocks from the first CBRC and second blocks from the second CBRC into the fail-over cache based on how frequently the first blocks and the second blocks are accessed, wherein blocks accessed more frequently are selected to be included in the fail-over cache prior to including blocks accessed less frequently up to the size limit.

19. The non-transitory computer-readable medium of claim 15, wherein the merging comprises removing selected blocks from the first CBRC and the second CBRC until a number of blocks in the fail-over cache does not exceed the size limit.

20. The non-transitory computer-readable medium of claim 15, wherein the merging includes performing two or more of:

(a) the merging of first blocks and second blocks based on assigned priorities of the at least one virtual computing instance;

(b) deduplicating blocks by including a single block in the fail-over cache when each of the first CBRC and the second CBRC includes a block with the same content; and (c) merging first blocks from the first CBRC and second blocks from the second CBRC into the fail-over cache based on how frequently the first blocks and the second blocks are accessed.

\* \* \* \* \*